United States Patent
Ward

[15] 3,637,063
[45] Jan. 25, 1972

[54] APPARATUS FOR SEPARATING GLASS SHEETS
[72] Inventor: Cecil R. Ward, Gibsonia, Pa.
[73] Assignee: PPG Industries, Inc., Pittsburgh, Pa.
[22] Filed: July 10, 1969
[21] Appl. No.: 840,629

[52] U.S. Cl......................................198/29, 193/37, 198/34
[51] Int. Cl................................................................B65g 47/22
[58] Field of Search....................198/34, 29; 193/35 B, 35 F,
193/37; 83/107, 102; 226/179, 192; 271/52

[56] References Cited

UNITED STATES PATENTS

| 2,672,337 | 3/1954 | Lorig et al | 226/192 X |
| 1,810,677 | 6/1931 | Pfeiffer | 83/102 X |
| 3,301,550 | 1/1967 | Reinecke | 83/102 X |

Primary Examiner—Richard E. Aegerter
Assistant Examiner—Douglas D. Watts
Attorney—Chisholm and Spencer

[57] ABSTRACT

Apparatus for transporting and separating severed glass sheets having flexible discs, and means for imparting an eccentric motion to the periphery of the discs, so as to impart an eccentric direction and separate the glass sheets.

4 Claims, 2 Drawing Figures

INVENTOR
CECIL R. WARD

BY Chisholm and Spencer
ATTORNEYS

APPARATUS FOR SEPARATING GLASS SHEETS

BACKGROUND OF THE INVENTION

Glass manufactured from a molten pool of glass is then further processed by severing it into desired sized sheets. The processing and handling of glass becomes more difficult as the volume of glass dealt with per unit of time increases with more modern processing and handling arrangements.

In the processing of glass, when the sheets are severed in the direction of glass travel, they are frequently damaged by the contract between the severed edges, which results in the chipping of the glass. The apparatus of this invention permits the separation of the glass and prevents this chipping while controlling the direction of glass travel.

The apparatus of this invention is designed for use in a system of severing and conveying sized sheets of glass which have been severed and cut out from a larger original sheet of glass.

SUMMARY OF THE INVENTION

This apparatus consists of a roll conveyor formed by one or more rolls placed transversely of the path of travel of a sheet of glass or other material. Interspaced between pairs of rolls are a plurality of thin, flexible discs mounted on a common shaft and rotatable in the general direction of glass travel. The axes of the discs are parallel to those of the other conveyor rolls; however, at the point of contact between one of the flexible discs and the glass, an angle not parallel to the direction of glass travel is established. The peripheral surface of the disc is distorted, giving it, in effect, an eccentric motion. Any glass in contact with the disc at the contacting point follows the direction of the moment of eccentricity. A result of this is to separate the glass sheets by preselected distances, which prevents the chipping of edges during motion of the glass down the conveyor.

Figure 1:
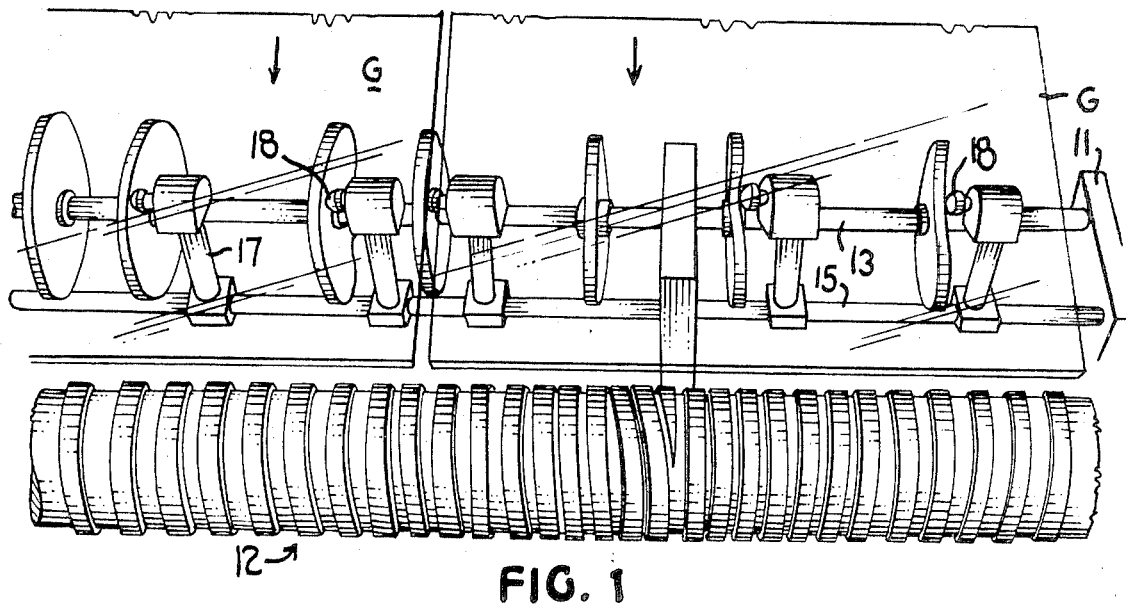
FIG. 1 illustrates a perspective view of the apparatus.

A conveyor path is suitably positioned for any desired path of glass travel. The conveyor has side rails 11 and also conveyor rolls 12 that extend transversely with respect; to the path of travel. A disc shaft 13 is disposed transversely of the path of travel and mounted so as to be rotatable in the direction of glass travel, the disc shaft being mounted in bearings in the conveyor side rails 11. A second or eccentric shaft 15 is mounted transversely of the path of travel in a relatively close position to the disc shaft 13. A plurality of flexible discs 16 are positioned at suitable intervals on the disc shaft 13 so as to be rotatable in the direction of glass travel along their outer peripheries. A plurality of eccentric arms 17 are mounted on the eccentric shaft 15 at intervals and in position to be within contacting distance of the discs 16. Each eccentric arm 17 has a portion near the end thereof which has a bearing surface 18. This bearing surface may be either an integral portion of the eccentric arm or a suitable extension thereof which contacts the disc shaft 13 near the periphery thereof.

Figure 2:
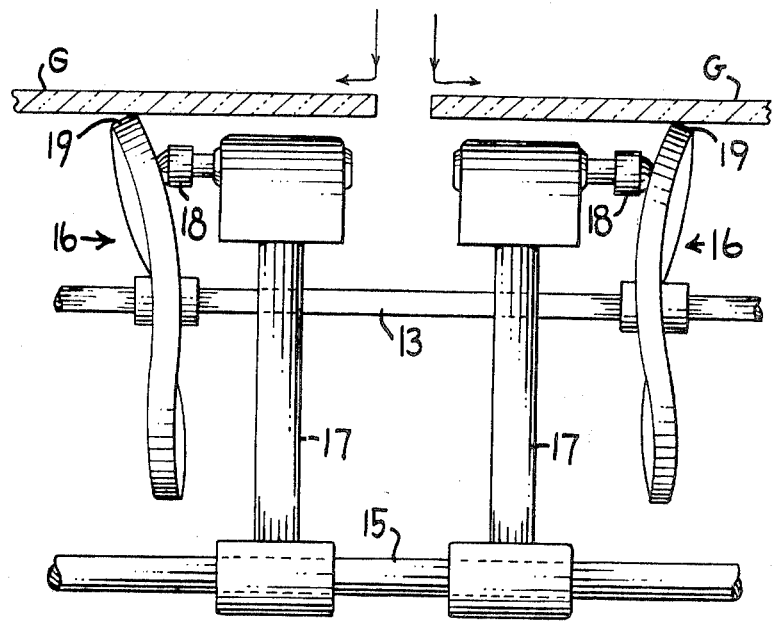
FIG. 2 is an enlarged view of a single disc and eccentric cam.

In FIG. 2, numeral 19 indicates the periphery of a typical disc 16. At the point of contact between the bearing surface 18 and the area of the disc near the periphery 19, the disc 16 is slightly distorted from a plane normal to the shaft 13. This distortion induces a motion having a component which is nonparallel with the direction of glass travel. The glass in contact with the periphery 19 of the disc 16 will tend to follow the direction of the moment induced by the eccentricity of the peripheral travel. The pressure of the bearing surfaces against the disc is adjustable. One means of adjustment is to position the eccentric arm 17 on eccentric shaft 15 so that the bearing surface may move against the periphery 19 exerting an adjustable pressure against the disc. Glass sheets G traveling down the conveyor path are separated by striking the peripheries 19 of the discs 16. FIG. 2 shows that the discs 16 to the right side of the conveyor have the bearing surfaces on the left side of the disc 16, whereas those discs to the left side of the conveyor have a bearing surface to the right side of the disc 16. By proper selection of the moment of eccentricity the invention can be used to process glass which is severed at any point other than the center in the direction of glass travel. It is possible, using the apparatus of this invention, to separate the discs quite readily, and once separated, they will then travel on roll 12 and subsequent rolls in a direction of glass travel and will not again come in contact at their edges. This eliminates problem of edge chipping.

I claim:
1. Apparatus for conveying and separating severed portions of glass sheets comprising:
   a. a conveyor section having side rails and having rotatable rolls journaled therein, said rolls being disposed transversely of the direction of glass travel and forming a path of travel for said sheets of glass;
   b. a disc shaft rotatably mounted between said conveyor rails and mounted transversely to the path of glass travel;
   c. a plurality of flexible discs having a periphery thereof, each of said discs being mounted on said disc shaft and rotatable in the direction of glass travel;
   d. an eccentric shaft mounted on said conveyor transverse to the path of glass travel; and
   e. a plurality of eccentric means mounted on said eccentric shaft and movable in relation to said flexible discs, a bearing surface being located near the end of each of said eccentric means so as to be contactable to the disc with which it comes into contact near its periphery, whereby said disc is distorted and the periphery of said disc is given an eccentric motion in a portion in the path of glass travel, whereby said glass sheets are separated from one another as they pass in the direction of said path of travel.

2. Apparatus for conveying and separating severed portions of glass sheets comprising:
   a. a conveyor section;
   b. a plurality of flexible discs mounted on a shaft and positioned transversely with respect to the path of travel of said glass sheets, each of said discs having a normal planar position and a periphery of said disc that moves in said path of travel; and
   c. means positioned adjacent to said discs for deflecting the peripheries of said discs away from said normal planar position by distorting said discs with only rotational motion of said shaft, whereby the peripheries of said discs are given eccentric motion in the portion of said peripheries in said path of glass travel.

3. Apparatus for conveying and separating severed portions of glass sheets comprising:
   a. a plurality of flexible discs, each of said discs having a normal planar position and a periphery that moves in a path of glass travel, and said plurality of discs being mounted transversely of said path of travel upon a shaft and rotatable in the direction of said glass travel; and
   b. means adjacent to said discs for deflecting a portion of the peripheries of said discs away from said normal planar position by distorting said discs with only rotational motion of said shaft, whereby the peripheries of said discs are given eccentric motion in a portion of said path of travel, some of said discs having an eccentric motion towards the left of said path of travel and others of said discs having eccentric motion towards the right of said path of travel of said glass.

4. Apparatus for conveying and separating severed portions of sheet material comprising:
   a. a conveyor section having side rails and having rotatable rolls journaled therein, said rolls being disposed transversely of the direction of material travel and forming a path of travel for said sheets of material;
   b. a disc shaft rotatably mounted between said conveyor rails and mounted transversely to the path of material travel;

c. a plurality of flexible discs having a periphery thereof, each of said discs being mounted on said disc shaft and rotatable in the direction of material travel;
d. an eccentric shaft mounted on said conveyor transverse to the path of material travel; and
e. a plurality of eccentric means mounted on said eccentric shaft and movable in relation to said flexible discs, a bearing surface being located near the end of each of said eccentric means so as to be contactable to the disc with which it comes into contact near its periphery, whereby said disc is distorted and the periphery of said disc is given an eccentric motion in a portion in the path of material travel, whereby said sheets are separated from one another as they pass in the direction of said path of travel.

* * * * *